United States Patent
Langdon

(10) Patent No.: US 11,941,506 B2
(45) Date of Patent: Mar. 26, 2024

(54) SYSTEM AND METHOD FOR MONITORING VIA SMART DEVICES

(71) Applicant: Hubbell Incorporated, Shelton, CT (US)

(72) Inventor: Paul Robert Langdon, Wethersfield, CT (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 17/166,553

(22) Filed: Feb. 3, 2021

(65) Prior Publication Data

US 2021/0241927 A1   Aug. 5, 2021

Related U.S. Application Data

(60) Provisional application No. 62/969,958, filed on Feb. 4, 2020.

(51) Int. Cl.
*G06N 3/04* (2023.01)
*G16Y 20/20* (2020.01)
*G16Y 40/10* (2020.01)
*G16Y 40/20* (2020.01)
*G16Y 40/50* (2020.01)

(52) U.S. Cl.
CPC .............. *G06N 3/04* (2013.01); *G16Y 20/20* (2020.01); *G16Y 40/10* (2020.01); *G16Y 40/20* (2020.01); *G16Y 40/50* (2020.01)

(58) Field of Classification Search
CPC .. G06N 3/04; G06N 3/08; G06N 3/00; G16Y 20/20; G16Y 40/10; G16Y 40/20; G16Y 40/50
See application file for complete search history.

(56) References Cited

U.S. PATENT DOCUMENTS

| | | | | |
|---|---|---|---|---|
| 9,888,371 B1* | 2/2018 | Jacob | ..................... | G08B 25/08 |
| 10,546,485 B1* | 1/2020 | Hutz | ..................... | G08B 23/00 |
| 10,580,407 B1* | 3/2020 | Sriram | ..................... | G10L 15/30 |
| 2008/0052039 A1* | 2/2008 | Miller | ..................... | G05B 17/02 |
| | | | | 702/182 |
| 2015/0244121 A1* | 8/2015 | Amelio | ................ | G06Q 10/063 |
| | | | | 439/620.21 |
| 2017/0188216 A1* | 6/2017 | Koskas | ................... | H04W 4/90 |
| 2017/0193390 A1* | 7/2017 | Weston | .................. | G06Q 50/01 |
| 2017/0285433 A1* | 10/2017 | Shrivastava | .............. | E06B 9/24 |
| 2018/0070210 A1* | 3/2018 | Bruck | ..................... | H04W 4/02 |

(Continued)

*Primary Examiner* — Kevin T Bates
*Assistant Examiner* — Ranjan Pant
(74) *Attorney, Agent, or Firm* — Robinson + Cole LLP

(57) ABSTRACT

A system and method for determining abnormal conditions based on signals received from smart devices. The method includes receiving, via a controller and transmitted via one or more devices, one or more first signals indicative of one or more first statuses of the one or more devices. The method includes determining, via the controller and based on the one or more first statuses, a base model. The method includes receiving, via the controller and transmitted via the one or more devices, one or more second signals indicative of one or more second statuses of the one or more devices. The method includes comparing, via the controller, the one or more statuses to the base model and determining, via the controller and based on the comparison, an occurrence of an abnormal condition.

20 Claims, 4 Drawing Sheets

(56) References Cited

U.S. PATENT DOCUMENTS

| | | | |
|---|---|---|---|
| 2018/0078149 A1* | 3/2018 | Fonte | G16H 50/50 |
| 2018/0293367 A1* | 10/2018 | Urman | G06F 21/32 |
| 2019/0049968 A1* | 2/2019 | Dean | A61G 5/04 |
| 2019/0228296 A1* | 7/2019 | Gefen | G06F 11/079 |
| 2019/0356505 A1* | 11/2019 | Madden | H04L 12/2812 |
| 2021/0146785 A1* | 5/2021 | Wang | G06N 20/00 |
| 2021/0216609 A1* | 7/2021 | Wakabayashi | G05B 23/0283 |
| 2022/0248263 A1* | 8/2022 | Yu | H04W 28/0236 |

\* cited by examiner

SYSTEM AND METHOD FOR MONITORING VIA SMART DEVICES

CROSS-REFERENCE TO RELATED APPLICATIONS

This application claims the benefit of, prior-filed U.S. Provisional Patent Application No. 62/969,958, filed Feb. 4, 2020, the entire contents of which are incorporated by reference.

FIELD

Embodiments relate to systems and methods for determining abnormal behavior of one or more individuals based on signals received from one or more smart devices.

SUMMARY

Houses are commonly implemented with a variety of smart devices, such as smart outlets, light switches, smart doorbells, smart thermostats, and personal assistants. These devices connect via a network to function together and assist with living. As users use these devices, such as turning on a light, leaving the house, or changing the temperature, the action may be stored in an internal memory or on the network. These actions may be combined to create a behavior model indicating a typical, or normal, behavior of the user as they go about their day-to-day.

As people get older, they may often need caretakers to assist with day-to-day needs. However, a feeling of independence is a desire experienced by many, and elderly may wish to live alone and perform regular daily actions on their own as much as possible. Smart devices assist with this desire for independence by assisting with regular tasks, such as turning on lights or the television without the need for a user to stand up. For example, a simple audio command may turn on the lights in a room. The commands and actions of a user may, as described above, be used to create a behavior model. This model may be used to determine abnormal activities, or a lack thereof, of elderly users. Additionally, smart devices may determine the occurrence of an abnormal condition and notify a caretaker. The use of smart devices to make such a determination ensures the well-being of the user in a non-obtrusive way.

One embodiment provides a method including receiving, via a controller and transmitted via one or more devices, one or more first signal indicative of one or more first statuses of the one or more devices. The method may also include determining, via the controller and based on the one or more first statuses, a base model. The method may further include receiving, via the controller and transmitted via the one or more devices, one or more second signals indicative of one or more second statuses of the one or more devices. The method may also include comparing, via the controller, the one or more second statuses to the base model, and determining, via the controller and based on the comparison, an occurrence of an abnormal condition.

In some embodiments, the method further includes transmitting a notification to an external device indicative of the abnormal condition. In some embodiments, the method further includes determining, based on the comparison, a safe score, and comparing the safe score to a threshold to determine the occurrence of the abnormal condition. In some embodiments, the one or more devices includes at least one selected from the group consisting of a smart light switch, a smart outlet, and a virtual assistant. In some embodiments, the statuses of the one or more devices may be at least one selected from the group consisting of an on state, an off state, an in use state, a motion detection indication, an open state, a closed state, or a physical action.

In some embodiments, the first statuses and the second statuses are attached to a timeline. In some embodiments, the timeline is displayed on an external device. In some embodiments, determining the base model further includes training an artificial neural network. In some embodiments, the one or more first signals indicative of one or more first statuses of the one or more devices are received during an installation period. In some embodiments, the method further comprises receiving, via the controller and transmitted via the one or more devices, one or more third signals indicative of one or more third statuses of the one or more devices, wherein the one or more third statuses are the same as the one or more second statuses, and updating, via the controller, the base model based on the one or more third statuses.

Another embodiment provides a system including an electronic processor. The electronic processor is configured to receive, via one or more smart devices, one or more first signals indicative of one or more event occurrences and determine a base model based on the one or more first signals. The electronic processor is configured to receive, via the one or more smart devices, one or more second signals indicative of one or more second event occurrences. The electronic processor is configured to compare the one or more second signals to the base model and determine an occurrence of an abnormal condition.

In some embodiments, the electronic processor is further configured to transmit a notification to an external device indicative of the abnormal condition. In some embodiments, the one or more smart devices includes at least one selected from the group consisting of a smart light switch, a smart outlet, and a virtual assistant. In some embodiments, the electronic processor is further configured to determine, based on the comparison, a safe score, and compare the safe score to a threshold to determine the occurrence of the abnormal condition. In some embodiments, the statuses of the one or more devices may be at least one selected from the group consisting of an on state, an off state, an in use state, a motion detection indication, an open state, a closed state, or a physical action.

In some embodiments, the first statuses and the second statuses are attached to a timeline. In some embodiments, the timeline is displayed on an external device. In some embodiments, determining the base model further includes training an artificial neural network. In some embodiments, the one or more first signals indicative of one or more first statuses of the one or more devices are received during an installation period. In some embodiments, the electronic processor is further configured to receive, via the one or more smart devices, one or more third signals indicative of one or more third statuses of the one or more devices, wherein the one or more third statuses are the same as the one or more second statuses, and update the base model based on the one or more third statuses.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
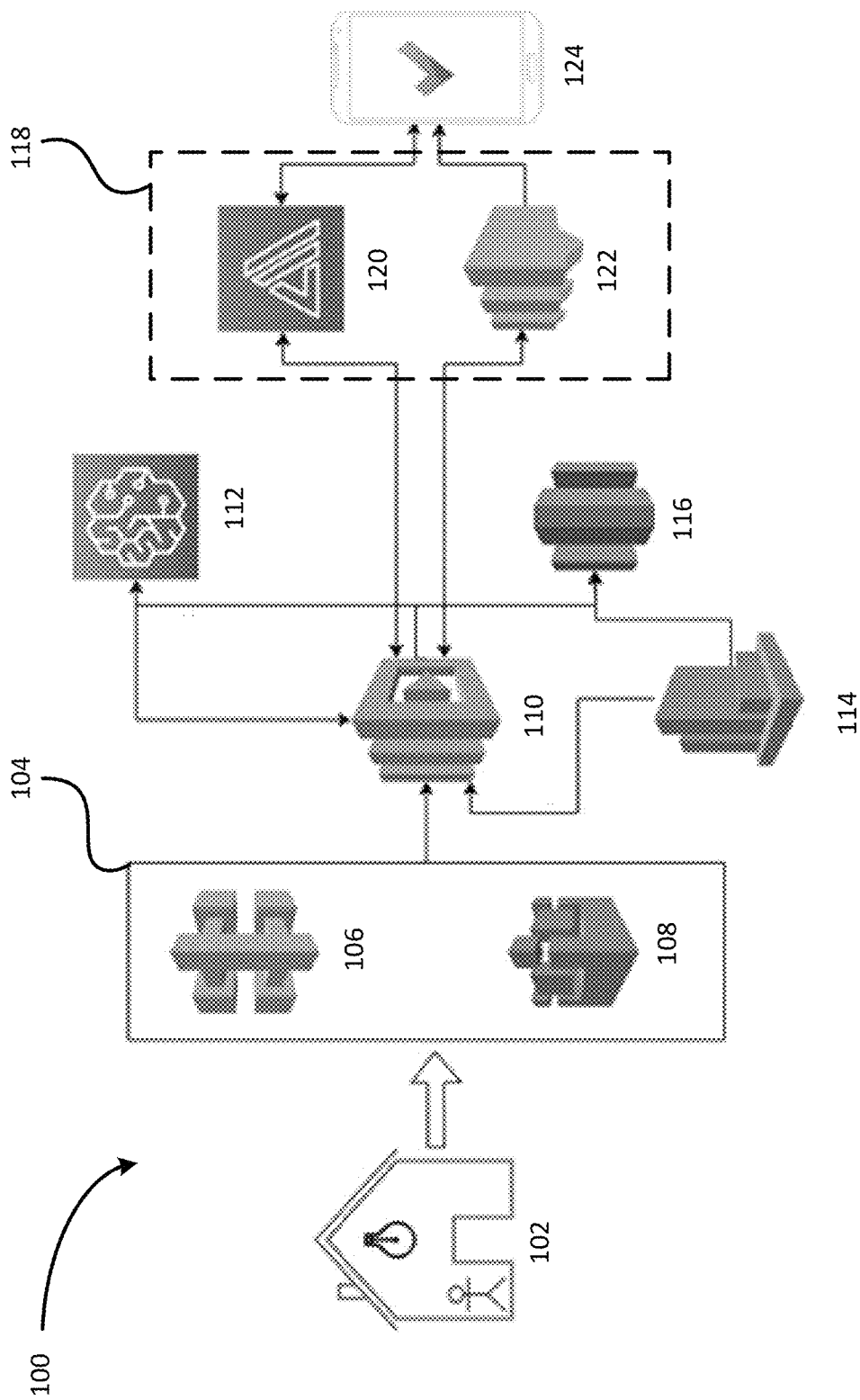
FIG. 1 illustrates a block diagram of a smart system according to some embodiments.

FIG. 1 illustrates a system 100 configured to generate and analyze smart device signals. The system 100 includes, for example, a smart home 102, an event ingestion module 104, an event processing module 110, an artificial intelligence (AI) management module 112, an event monitoring module 114, a database 116, a wireless module 118, and an external device 124. The smart home 102 may include, for example, one or more smart devices, such as a smart light switch, a smart outlet, and/or a virtual assistant (e.g., Google Home™, Amazon Alexa™, or the like).

Figure 2:
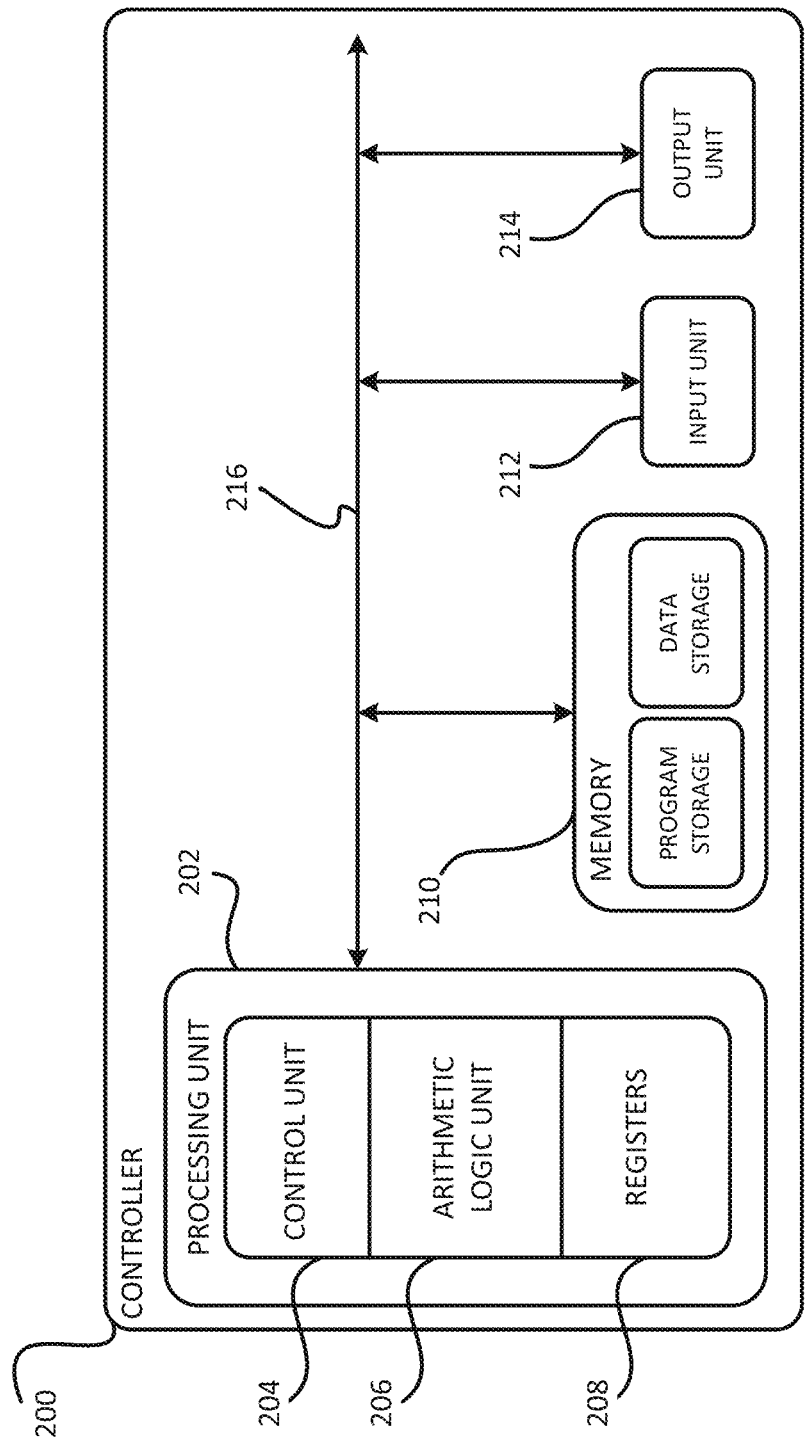
FIG. 2 illustrates a block diagram of a controller, according to some embodiments.

As illustrated in FIG. 2, the smart devices may include a controller 200 configured to control operation of the smart device. The controller 200 includes, for example, a processing unit 202, a memory 210, an input unit 212, and an output unit 214. The processing unit 202 includes a control unit 204, an arithmetic logic unit ("ALU") 206, and a plurality of registers 208 (shown as a group of registers in FIG. 2). The controller 200, the processing unit 202, the memory 210, the input unit 212, and output unit 214, as well as various modules or circuits connected to the controller 200 are connected by one or more control and/or data buses 216.

The memory 210 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 202 is connected to the memory 210 and executes software instructions that are capable of being stored in a RAM of the memory 210 (e.g., during execution), a ROM of the memory 210 (e.g., on a generally permanent basis), or another non-transitory computer readable medium such as another memory or a disc. The controller 200 is configured to retrieve from the memory 210 and execute, among other things, instructions related to the control processes and methods described herein. In other embodiments, the controller 200 includes additional, fewer, or different components.

Software included in the implementation of the system 100 and controller 200 can be stored in the memory 210 of the controller 200. The software includes, for example, firmware, one or more applications, program data, filters, rules, one or more program modules, and other executable instructions. In some embodiments, the software may be implemented by a separate or additional component of the system 100. For example, software may be implemented by a server connected to the system 100 via a wireless network, such as the cloud.

The input unit 212 may be, for example, a microphone, a keyboard, or the like. When receiving a verbal command from a user, for example, the smart device receives the command via the microphone. The command may then be processed using a natural language processor. The smart device then outputs the result via the output unit 214, which may be, for example, a speaker, or a switch connected to a power outlet or a power source. Each process conducted by one or the smart devices is processed as an event (e.g., event signal). Each event indicates a status of the smart device. Statuses may indicate, for example, an on state, an off state, an in-use state, a motion detection indication, an open state, a closed state, a physical action, or the like. Additionally, events may include the method in which the state was changed or set (e.g., an event source). The event source may be, for example, an audio or voice trigger, a signal received via a software application, or a signal received by a sensor.

Additionally, the smart devices may communicate with each other to achieve the desired output. For example, a virtual assistant in a bedroom may receive a verbal command such as "turn on the lights in the kitchen." The virtual assistant transmits a signal to a smart overhead light in the kitchen indicating the request. The overhead light in the kitchen then turns on. In some embodiments, the overhead light may notify the virtual assistant that the task has been complete. The virtual assistant may then supply a visual or audio notification to the user indicating the completion of the task.

Returning to FIG. 1, events generated by the smart devices of the smart home 102 are received by the event ingestion module 104. The event ingestion module 104 may include, for example, an API gateway 106 and a web servicing module 108. The event ingestion module 104 may combine multiple applications, such as a variety of different smart devices, into a single location for a user. Additionally, the event ingestion module 104 may format signals received from the various smart devices into a cohesive format understood and analyzed by the event processing module 110. In some embodiments, the event ingestion module 104 functions as an internet-of-things (IoT) system.

The event processing module 110 receives events from the event ingestion module 104. The event processing module 110 analyzes the events and compares them to a model (e.g., a behavior model) indicative of a normal occurrence of events. To maintain the model and determine abnormal event signals (e.g., abnormal conditions, abnormal behaviors, abnormal events), the event processing module 110 works in conjunction with the AI management module 112, the event monitoring module 114, and the database 116.

Events are transmitted from the event processing module 110 to the AI management module 112. The AI management module 112 may include an artificial intelligence program implementing a neural network, such as a recurrent neural network, a convolutional neural network, a residual neural network, or the like. To train the neural network, the event processing module 110 may transmit a first plurality of event signals to the AI management module 112. The first plurality of event signals corresponds to an initial period of time in which the user implements the disclosure, or an installation period. For example, when the user installs the disclosure, the AI management module 112 may build a model based on the event signals received for one week after the installation, or the length of the installation period. The model then reflects all events collected by the smart devices. This model may be used as a base model of which future events are compared to. In some embodiments, the installation period may be determined via a user input. In some embodiments, the installation period is a setting (e.g., amount of time) stored within the database 116.

In some embodiments, the AI management module 112 receives second event signals, which are event signals received after the base model is built. These second event signals are compared to the base model to determine abnormal events. The second event signals may be compared to the base model individually, as they are received by the event processing module 110, or in groups, such as a group of all event signals received by the event processing module 110 throughout the day. In some embodiments, after comparing the second event signals to the base model, a score (e.g., a safe score) may be assigned to the second event signals. The score may, for example, be a probability of the similarity between the second event signals and the base model. This score may be compared to a threshold to determine the occurrence of an abnormal condition. In some embodiments, the AI management module 112 uses the score to further refine the base model. For example, if the second event signals and the base model are 90% similar, the second event signals may then be built into the base model as similar behavior. If the second event signal occurs a second time, the score may increase to 92%.

The event processing module 110 may also transmit events to the event monitoring module 114. In some embodiments, the event monitoring module 114 maintains a schedule of expected events. For example, the base model may indicate a coffee pot is turned on between 7 AM and 8 AM each day. If the coffee pot is not turned on, the event monitoring module 114 may notify the event processing module 110 of the lack of the event (e.g., an OFF event instead of an ON event). In some embodiments, the event monitoring module 114 stores and receives data from the database 116. For example, each event received from the smart devices of the smart home 102 may be stored in the database 116. Additionally, the event monitoring module 114 may store data indicative of a lack of an event in the database 116. When abnormal behavior is detected, the event monitoring module 114 may store data indicative of the abnormal behavior in the database 116.

In some embodiments, the event processing module 110, the AI management module 112, the event monitoring module 114, and the database 116 are combined into a single electronic processor with a memory similar to that of memory 210. The disclosure is not limited to each being a separate processor or program, and allows for various combinations of the listed modules.

The event processing module 110 may transmit event information stored in the database 116 to an external device 124 via the wireless module 118. The external device 124 may be, for example, a mobile device, a tablet, a personal computer, a wearable device (for example, a smart watch), and/or the like. In some embodiments, the wireless module 118 includes an internet-accessible user interface 120 and a simple notification service (SNS) module 122. The internet-accessible user interface 120 may be, for example, a web site accessed by a user with the external device 124, an application accessible with the external device 124, or the like. A user may access the internet-accessible user interface 120 to view recent events collected by the smart devices. For example, statuses of the smart devices collected by the event processing module 110 and stored in the database 116 may be shown as a timeline showing the time at which each event occurred. In some embodiments, the timeline is generated by the event processing module 110. This timeline is displayed on a display screen of the external device 124. The SNS module 122 may work in conjunction with the internet-accessible user interface 120 to provide a push notification on the external device 124. For example, the SNS module 122 may provide a push notification to the external device 124 indicating an abnormal event has occurred.

Figure 3:
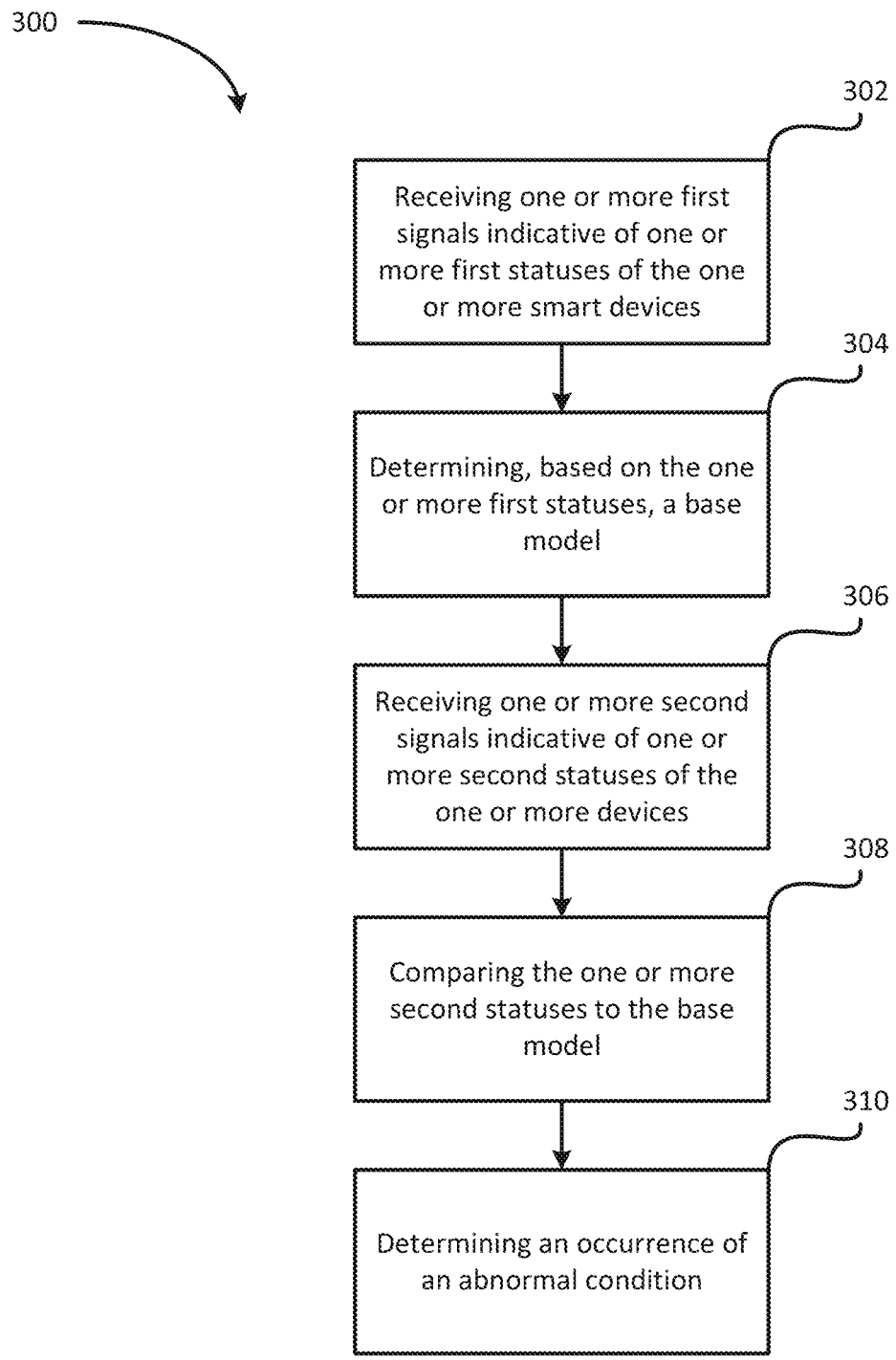
FIG. 3 is a flow chart of a method performed by the controller of FIG. 2, according to some embodiments.

FIG. 3 illustrates a method, or process, 300 performed by the event processing module 110, according to some embodiments. At block 302, the event processing module 110 receives one or more first signals indicative of one or more first statuses of the one or more smart devices. The one or more first signals may be, for example, signals received during the installation period. At block 304, the event processing module 110 determines, based on the one or more first signals, a base model. This base model may be, for example, the model built by the AI management module 112.

At block 306, the event processing module 110 receives one or more second signals indicative of one or more second statuses of the one or more devices. The one or more second signals may be, for example, any signal received from a smart device after the installation period is complete. At block 308, the event processing module 110 determines an occurrence of an abnormal condition. For example, an event collected by a smart device does not match historical events established by the base model. In some embodiments, the event processing module 110 transmits a notification to an external device 124 indicative of the abnormal condition. For example, if the AI management module 112 determines a score of the second event signals is greater than a safety threshold, the event processing module 110 transmits a notification to an external device 124 notifying a user of the abnormal condition.

In some embodiments, the one or more second signals may not indicate an abnormal condition. In this situation, the event processing module 110 may receive one or more third signals indicative of one or more third statuses of the one or more devices. In some embodiments, the one or more third statuses indicate the occurrence of an abnormal condition. In some embodiments, the one or more third statuses may be the same as the one or more second statuses. When the one or more third statuses and the one or more second statuses are the same, but different than the one or more first statuses, the event processing module 110 may update the base model to reflect the one or more third statuses.

In some embodiments, the event processing module 110 may update the base model based on recurring abnormal conditions. For example, the one or more first signals may indicate an outlet connected to a coffee pot is initiated each day at 7 AM. This time is stored by the event monitoring module 114 and is built into the base model. However, a recurring number of the one or more second signals may indicate the outlet connected to the coffee pot is initiated at 8 AM each day. When the event becomes a recurring event, the base model may be modified to reflect the new occurrence. The recurring event may be, for example, a new event, the lack of a previous event, or the like.

Figure 4:
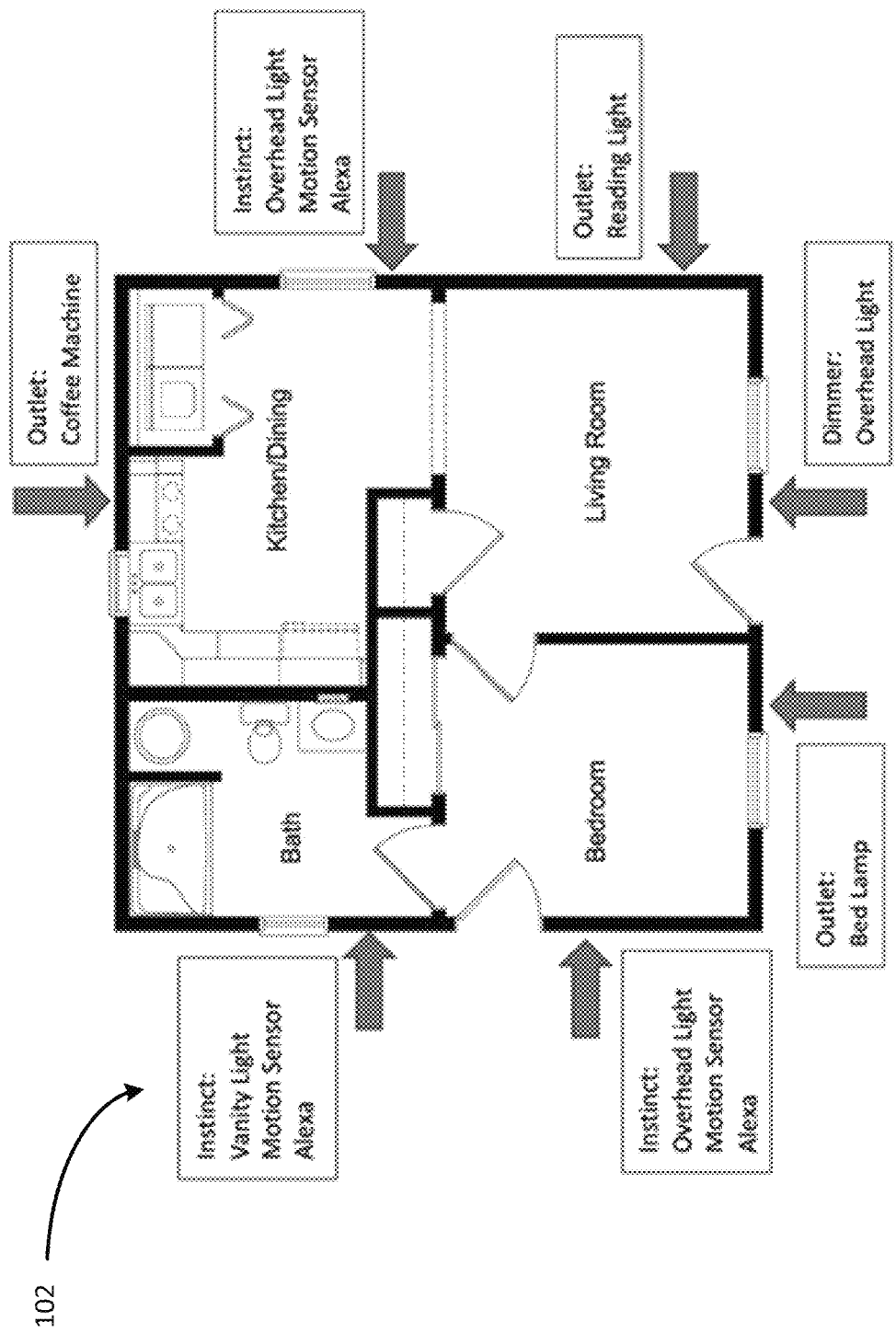
FIG. 4 illustrates the home of FIG. 1, according to some embodiments.

FIG. 4 provides an example of a smart home 102 that may implement the disclosed system and method. The smart home 102 includes a variety of smart devices in each room. For example, the bathroom has a smart vanity light, a motion sensor, and an Amazon Alexa™. The bedroom includes a smart overhead light, a motion sensor, an Amazon Alexa™, and a smart outlet configured to control a bedside lamp. The living room includes a smart dimmer configured to control an overhead light, and a smart outlet configured to control a reading light. The kitchen/dining room includes a smart overhead light, a motion sensor, an Amazon Alexa™, and a smart outlet controlling a coffee machine (e.g., a coffee pot). Each of these devices may include, for example, the controller 200.

A base model built by the AI management module 112 and implemented by the event processing module 110 may include a regular schedule performed by a person living in the smart home 102. For example, based on signals received from the various smart devices, the base model may have learned the user turns on the bed lamp in the bedroom at approximately 6:30 AM each day. The motion sensor in the bathroom detects movement between 6:45 AM and 7:15 AM each day. The smart outlet configured to control the coffee machine in the kitchen is turned on at approximately 7:20 AM each day. Finally, each smart device is turned off at approximately 8:00 AM prior to the user leaving for the day.

However, after this model is built, the user may become sick and not wake up until 9:00 AM. Each of the events listed above do not occur. The event monitoring module 114 detects the lack of events and transmits a signal indicating the lack of events to the event processing module 110. The event processing module 110 receives the signal from the event processing module 110 and transmits the signal to the AI management module 112. The AI management module 112 receives the signal and determines a safe score based on the lack of events. The AI management module 112 compares the safe score to a safe score threshold. If the safe score passes the safe score threshold (e.g., is lower than a desired score), the AI management module 112 transmits a warning signal to the event processing module 110. The event processing module 110 receives the warning signal, determines an abnormal condition has occurred, and transmits a notification to the external device 124 via the wireless module 118. The external device 124 may be, for example a mobile device that belongs to a caretaker of the owner of the smart home 102. The caretaker may then decides to check on the user.

Embodiments provide, among other things, systems and method for determining abnormal behavior based on signals received from smart devices. Various features and advantages of the application are set forth in the following claims.

What is claimed is:

1. A method comprising:
    transmitting, via one or more devices, one or more first signals indicative of one or more first statuses of the one or more devices;
    receiving, via a controller, the one or more first signals;
    determining, via the controller and based on the one or more first statuses, a base model;
    transmitting, via one or more devices, one or more second signals indicative of one or more second statuses of the one or more devices;
    receiving, via the controller, the one or more second signals;
    comparing, via the controller, the one or more second statuses to the base model;
    determining, via the controller and based on said comparing, an occurrence of an abnormal condition when the one or more second statuses are different than the base model;
    receiving, via the controller and transmitted via the one or more devices, one or more third signals indicative of one or more third statuses of the one or more devices;
    determining, via the controller, an occurrence of a recurring abnormal condition when the one or more third statuses are the same as the one or more second statuses;
    updating, via the controller, the base model based on the recurring abnormal condition to modify the first status to include the recurring abnormal condition;
    determining, based on the comparison, a safe score;
    comparing the safe score to a threshold to determine the occurrence of the abnormal condition; and
    comparing, via the controller, the safe score to the base model and updating the base model if the safe score is within a similarity range of the base model.

2. The method of claim 1, further comprising transmitting a notification to an external device indicative of the abnormal condition.

3. The method of claim 1, wherein the one or more devices includes at least one from a group consisting of a smart light switch, a smart outlet, and a virtual assistant.

4. The method of claim 1, wherein the first statuses and the second statuses of the one or more devices are at least one from a group consisting of an on state, an off state, an in use state, a motion detection indication, an open state, a closed state, or a physical action.

5. The method of claim 1, further comprising generating a timeline including the first statuses and the second statuses.

6. The method of claim 5, wherein the timeline is displayed on an external device.

7. The method of claim 1, wherein determining the base model further includes training an artificial neural network.

8. The method of claim 1, wherein the one or more first signals indicative of one or more first statuses of the one or more devices are received during an installation period.

9. The method of claim 1, further comprising comparing, via the controller, the one or more second statuses to a scheduled event stored in a database.

10. The method of claim 1, wherein the second signal is built into the base model if it is 90% similar to the base model.

11. A system comprising:
    an electronic processor receiving, via one or more smart devices, one or more first signals indicative of one or more statuses of the one or more smart devices, wherein said electronic processor further,
    determines a base model based on the one or more first signals;
    receives, via the one or more smart devices, one or more second signals indicative of one or more second statuses of the one or more devices;
    compares the one or more second signals to the base model;
    determines an occurrence of an abnormal condition when the one or more second statuses are different than the base model;
    receives, via the one or more smart devices, one or more third signals indicative of one or more third statuses of the one or more devices;
    determines an occurrence of a recurring abnormal condition when the one or more third statuses are the same as the one or more second statuses; and updates the base model based on the recurring abnormal condition to modify the first status to include the recurring abnormal condition;

determines, based on the comparison, a safe score;

compares the safe score to a threshold to determine the occurrence of the abnormal condition; and compares the safe score to the base model and updates the base model if the safe score is within a similarity range of the base model.

12. The system of claim 11, wherein the electronic processor further transmits a notification to an external device indicative of the abnormal condition.

13. The system of claim 11, wherein the one or more smart devices includes at least one from a group consisting of a smart light switch, a smart outlet, and a virtual assistant.

14. The system of claim 11, wherein the first statuses and the second statuses of the one or more devices are at least one from a group consisting of an on state, an off state, an in use state, a motion detection indication, an open state, a closed state, or a physical action.

15. The system of claim 11, wherein the electronic processor generates a timeline including the first statuses and the second statuses.

16. The system of claim 15, wherein the timeline is displayed on an external device.

17. The system of claim 11, wherein determining the base model further includes training an artificial neural network.

18. The system of claim 11, wherein the one or more first signals indicative of one or more first statuses of the one or more devices are received during an installation period.

19. The system of claim 11, wherein the second signal is built into the base model if it is 90% similar to the base model.

20. The system of claim 11, wherein the electronic processor compares the one or more second statuses to a scheduled event stored in a database.

* * * * *